May 8, 1928.
J. KINDERVATER
1,669,252
HOLLOW FLEXIBLE STAYBOLT
Filed June 10, 1926
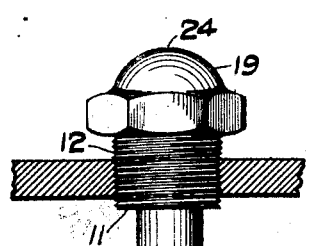
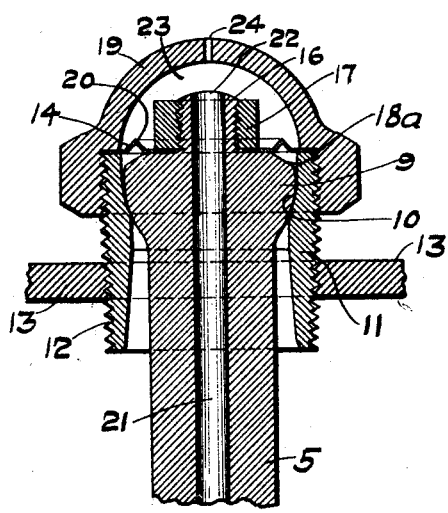
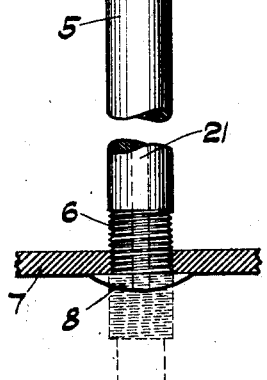
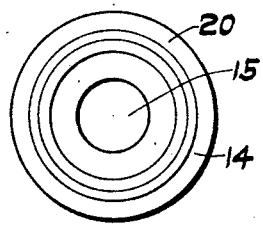
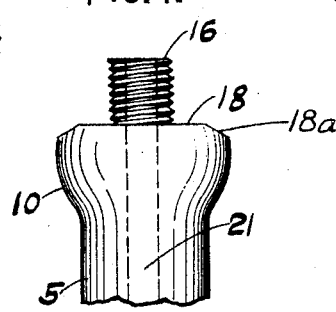
INVENTOR
Julius Kindervater
BY
Clarence D Kerr
ATTORNEY Patented May 8, 1928.

1,669,252

UNITED STATES PATENT OFFICE.

JULIUS KINDERVATER, OF RICHMOND, VIRGINIA.

HOLLOW FLEXIBLE STAY BOLT.

Application filed June 10, 1926. Serial No. 115,028.

This invention relates to flexible staybolts of the type comprising a sleeve adapted to be attached to the boiler shell sheet and formed with an internal spherical seat; a bolt member, formed with a tell tale bore, and having, at one end, a spherical head fitted in the sleeve and bearing on the seat; a cap closing the end of the sleeve, and a diaphragm within the sleeve, sealing the joint between the sleeve and the spherical head against the passage of steam.

An object of the present invention is to provide an improved staybolt of the type described, which, while effecting an efficient steam tight joint between the sleeve and bolt member, will permit a wide range of turning movement of the spherical head, without imposing undesirable shearing stresses on the diaphragm.

In the accompanying drawings: Figure 1 is a side view, in elevation, of a staybolt, embodying my invention, applied to the shell sheet and firebox sheet of a boiler; Fig. 2, a view, in central vertical section, on an enlarged scale, of the outer end of the staybolt shown in Fig. 1; Fig. 3, a plan view of the sealing diaphragm; and, Fig. 4, a side view, in elevation, of the spherical end of the staybolt.

The improvement claimed is hereinafter fully set forth.

In the practice of my invention, referring descriptively to the specific embodiment thereof which is herein exemplified, I provide a staybolt structure comprising a bolt member, 5, having a threaded inner portion, 6, which is adapted to be screwed into the fire box sheet, 7. After the inner portion of the bolt is screwed in place, the inner end is cut off by a torch, and the portion disposed at the inner side of the fire box sheet is upset, or riveted, to provide a head, 8, which permanently locks the bolt to the fire box sheet.

The outer end of the bolt is provided with an enlarged head, comprising a spherical or rounded face, 9, adapted to engage, and have relative ball and socket movement with, a seat, 10, formed on the inner surface of the outer end of a sleeve member, 11. The sleeve member, 11, has a screw thread, 12, on its exterior, which is screwed into a suitably threaded opening in the boiler shell sheet, 13. It will be noted that the sleeve member engages the boiler shell sheet, midway of the length of the sleeve, so that the rounded head of the bolt is disposed outside of the boiler shell sheet.

In order to prevent leakage of steam through the joint formed between the seat, 10, of the sleeve, and the spherical face, 9, of the bolt, a circular sealing diaphragm, 14, is provided. The diaphragm is provided with an opening, 15, at its centre, through which passes a reduced threaded extension, 16, on the head of the bolt. Surrounding the extension, 16, is an annular clamping face, 18, disposed cross-axially of the bolt, between which and the nut, 17, threaded on the extension, the inner portion of the diaphragm is clamped. In order to permit the headed end of the bolt to assume a wide range of turning movements on the seat in the sleeve, without imposing undesirable shearing stresses on the diaphragm, the portion of the head of the bolt, between the clamping face, 18, and the spherical face, 9, is tapered, or made of frusto-conical form, and a corrugation, 20, is formed in the diaphragm, concentric with the axis thereof. It will be noted that, in the improved construction, an intermediate face, 18$^a$, is disposed between the clamping and spherical faces of the head of the bolt. The outer rim of the diaphragm is clamped to the top of the sleeve by a cap, 19, having screw threaded engagement with the threads, 11, on the exterior of the sleeve.

The bolt member, 5, is formed with a telltale bore, 21, so that if a break occurs in the bolt, steam will escape through the outer end, 22, of the bore, into the space, 23, in the cap member. A tell tale opening, 24, is provided in the cap member to permit steam escaping into the space, 23, to escape into the atmosphere, to apprise the operator of the failure of the bolt member.

The invention claimed and desired to be secured by Letters Patent is:

In a flexible staybolt, the combination of a sleeve adapted to be fitted in an opening in the boiler shell sheet, and having an internal spherical bearing seat; a bolt member having a head, adapted to fit within the sleeve, formed with a tell-tale bore, and comprising a spherical face adapted for universal movement on said seat, a clamping face disposed above said spherical face, and at a right angle to the axis of the bolt, an intermediate frusto-conical face extending downwardly and outwardly from said clamping face to said spherical face, and a threaded extension projecting above the clamping face; a nut, threaded on said extension; a cap for closing an end of said sleeve; and a diaphragm having a concentric corrugation, said diaphragm having an inner periphery gripped between the clamping face and the nut of the head of the bolt member, and an outer periphery gripped between the sleeve and the cap.

JULIUS KINDERVATER.